(12) United States Patent
Bermel

(10) Patent No.: US 6,390,376 B2
(45) Date of Patent: May 21, 2002

(54) METHOD AND APPARATUS FOR PROVIDING TARGETED ADVERTISING IN PUBLIC AREAS

(76) Inventor: Paul Bermel, 684 Collier Commons Cir., NW., Atlanta, GA (US) 30318

( * ) Notice: Subject to any disclaimer, the term of this patent is extended or adjusted under 35 U.S.C. 154(b) by 0 days.

(21) Appl. No.: 09/790,997

(22) Filed: Feb. 22, 2001

Related U.S. Application Data

(60) Provisional application No. 60/184,439, filed on Feb. 22, 2001.

(51) Int. Cl.[7] .............................................. G06K 19/06
(52) U.S. Cl. ...................................... 235/492; 235/384
(58) Field of Search ................................ 235/492, 384; 705/14

(56) References Cited

U.S. PATENT DOCUMENTS

| | | | |
|---|---|---|---|
| 5,650,604 A | * | 7/1997 | Marcous ..................... 235/492 |
| 5,664,948 A | | 9/1997 | Dimitriadis et al. |
| 5,893,075 A | | 4/1999 | Plainfield |
| 5,933,811 A | | 8/1999 | Angles et al. |
| 5,948,061 A | | 9/1999 | Merriman et al. |
| 5,974,396 A | | 10/1999 | Anderson et al. |
| 5,992,888 A | | 11/1999 | North et al. |
| 5,995,942 A | | 11/1999 | Smith et al. |
| 6,013,007 A | | 1/2000 | Root et al. |
| 6,026,369 A | | 2/2000 | Capek |

FOREIGN PATENT DOCUMENTS

JP 2-44744 * 2/1990

* cited by examiner

Primary Examiner—Harold I Pitts
(74) Attorney, Agent, or Firm—Baker, Donelson, Bearman & Caldwell

(57) ABSTRACT

A display device (10) adapted to provide a display of advertising or other information messages targeted to persons in the vicinity of the display device, with a controller (14) that communicates with at least one of a plurality of electronic cards (20) in the possession of persons in the vicinity of the display device. Each electronic card stores information regarding the person associated with the electronic card. A communicator (24) receives signals from the electronic cards in the vicinity of the display device. The communicator (24) communicates with a central computer (28) that selects advertising and other information messages based on the information about the person. The central computer communicates the selected advertisements to the display device for display to the person in the vicinity of the display device.

7 Claims, 1 Drawing Sheet

METHOD AND APPARATUS FOR PROVIDING TARGETED ADVERTISING IN PUBLIC AREAS

This appln. claims Benefit of 60/184,439 Feb. 22, 2001.

TECHNICAL FIELD

The present invention relates to advertising devices for public areas. More particularly, the present invention relates to advertising devices that provide advertising and other information targeted to the interests of persons in the vicinity of the advertising device.

BACKGROUND OF THE PRESENT INVENTION

More and more mass transit authorities are moving in the direction of implementing stored value/smart cards as rider commutation instruments. These stored value/smart cards are small, typically plastic bodies that enclose electronic circuitry having a microprocessor and limited amounts of memory. The memory stores a balance available for accessing through special readers to purchase goods and services. Mass transit authorities generally are using such stored value/smart cards for passengers to purchase commute travel on the transit vehicles of the transit system. The present invention provides the capability to execute integrated advertising with the ability to distribute advertiser information to the card or to the card holder via electronic mail on a global interactive information network or direct mail.

Not only can the initial advertising messages be targeted to the specific transit station, but also the same degree of specificity for direct marketing will be enabled for smart cards. The present invention provides a complementary distribution channel for additional advertiser information.

By way of background, out of the 6.2 million residents in Hong Kong, 5 million have contactless smart cards. All 27 transit (train and bus) agencies in the San Francisco market recently committed to using a universal smart card from Motorola that will enable the rider ease of transportation in the market. New York City Transit, Washington, D.C., and Chicago (CTA) are stored value card markets. DC is migrating to contactless smart cards. Atlanta has an RFP out for a stored value/smart card.

Further, advertising in public places, such as transit stations, is generally directed to the public at large. Demographic information may be useful in selecting advertisements and areas for advertising. Heretofore, however, advertising directed to the interests of particular persons has not been satisfactorily accomplished.

Accordingly, there is a need in the art for providing advertising and other information messages targeted to the interests of persons in the vicinity of display devices. It is to such that the present invention is directed.

SUMMARY OF THE PRESENT INVENTION

The present invention meets the need in the art by providing a targeted informational system to provide advertising and other information messages targeted to the interests of persons in the vicinity of a display device for displaying the advertising and other information messages. The apparatus includes a display device adapted to provide a display of advertising or other information messages to persons in the vicinity of said display device. A controller is operatively coupled to said display device and adapted to communicate with at least one of a plurality of electronic cards. The electronic cards are in the possession of persons in the vicinity of said display device. The controller also sequences advertising and other information messages for display on said display device. Each of the electronic cards is adapted to receive and to store information regarding the person associated with said electronic card. A communicator is coupled to said display device and adapted to communicate with said controller and to receive signals from the electronic cards in the vicinity of the display device. A central computer communicates with the communicator, for receiving signals representative of the information about persons having said electronic cards in the vicinity of the display device and for communicating to the communicator advertising and other information messages relevant to particular persons in the vicinity of the display device. The display device displays advertising and other information messages targeted to the interests of particular persons in the vicinity of the display device.

Objects, advantages, and features of the present invention will become apparent upon a reading of the following detailed description, in conjunction with the claims and the appended drawings.

DETAILED DESCRIPTION OF THE PRESENT INVENTION

Figure 1:
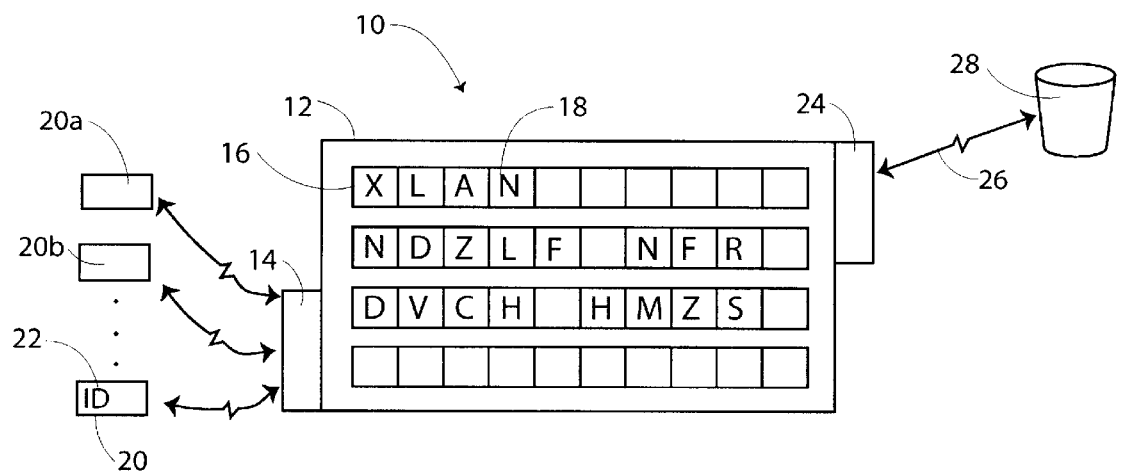
FIG. 1 is a schematic illustration of an advertising device according to the present invention.

Referring now in more detail to the drawings, in which like numerals indicate like parts throughout the several views, FIG. 1 illustrates an advertising device 10 for providing targeted advertising to persons in the vicinity of the device. The device 10 comprises a display panel 12 with a controller 14 for operating the display panel. In the illustrated embodiment, the display panel 12 comprises a LED display of four lines 16 with a plurality of addressable characters 18. LED displays conventionally have a plurality of lines with each having addressable characters for display of letters, symbols, graphics, and numbers. The device 10 is mounted in a public area, such as a transit station platform (not illustrated).

The controller 14 communicates with an electronic card 20 that contains a signal-responsive electronic circuit. One embodiment of the card 20 is a "smart card" containing a microprocessor on a integrated circuit board. Preferably, the card 20 is "contactless", whereby physical contact with the card is not required for communication of information between the card and a reader device receiving information from the card. These type of electronic cards typically are used to carry a replenishable currency balance or for accessing a bank account for debiting for purchases of goods and/or services from a provider by a person using the card. The circuit acknowledges the interrogation by the controller 14 and provides a unique code 22 in response. The unique code 22 is associated with a person carrying the card 20.

The device 10 further includes a communicator 24 for exchanging information by a communication link 26 with, a central computer 28 that maintains a database of information such as advertisements, news, features, and other information for display by the device. Particularly the central computer 28 includes control software for coordinating the communication of messages to the advertising display device 10 for presentation on the display panel 12. The communicator 24 is preferably wireless, and comprises a transceiver for receiving and sending messages between the device 10 and the computer 28. The transceiver in a preferred embodiment is a paging transceiver for receiving and transmitting information in a paging network environment. In alternate embodiments, the communications link 26 for the communicator 24 comprises direct wired connection to the computer 28, connection by modem and telephone lines, fiber optic, or other such connection mechanisms.

The central computer 28 includes registration information provided by the person carrying the card 20. This information includes the name, address, electronic mail address, account information, and other relevant information about the person. Other relevant information includes designations by the person of topical interests such as news categories, sports, financial, either in broad categories or in specific details. For example, one person designates the broad category of professional sports league while another designates the narrower category of a particular sports team. Preferably, registration is accomplished through submission of a form in HTML language on an interactive web site maintained on a global interactive network. It is noted that the central computer 28 upon registration of the person, conducts reverse lookups in other relevant databases maintained by others for developing a purchase history and profile, using as search indicia the name, address, e-mail address and other information.

The database maintained by the central computer 28 provides a list of entities that offer purchase discounts to persons using the stored value cards 20. This information is accessible by the holder of the card through a global interactive information network, by fax on demand capability, or by conventional mail in response to a telephone, written, or electronic submission of a request for such information.

Figure 2:
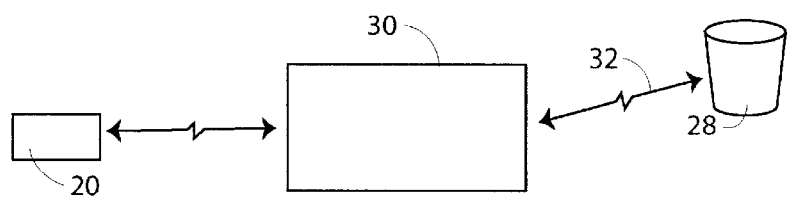
FIG. 2 is a schematic illustration of the advertising device according to the present invention.

With reference to FIG. 2, the card 20 is presented by the owner to a provider 30 of goods and services. The provider 30 has a reader device for accessing the card 20 to determine the unique code 22 associated with a person carrying the card 20. The unique code 22, together with identification of the purchased goods or services is communicated 32 to the central computer 28. Over time, an historical record is created by the central computer 28 providing a historical indication of the goods and services of interest to the particular person identified by the code 22. Based on the purchase history, advertisements directed to the person can be provided.

With reference to FIG. 1, the present invention provides directed advertisements to the person in public areas, such as transit stations for mass transit systems. The invention also provides directed news, features, and other information to the person. This is accomplished by the controller 14 making a general interrogation to the plurality of electronic cards 20 within a particular range of the controller 14. The cards 20 which are interrogated respond to the controller 14 and provide the respective unique code 22. Control circuitry is provided whereby the controller 14 ignores multiple responses from the same card 20 within a selected period of time, for example, within a thirty minute window of the first response to the interrogation by the particular card 20.

To ascertain the areas of interest for the directed information, the controller 14 connects to the communicator 24 for accessing the central computer 28. The controller 14 communicates the unique code 22 with a request for targeted information including news, features and advertising messages. The central computer 28 evaluates the unique code 28 in view of its history of purchases of goods and services by the person with whom the unique code is associated. One or more messages of advertising are then communicated by the central computer 28 to the communicator 24 for transfer to the controller 14. The news and features categories can also be communicated, together with such information. The controller 14 then sequences the received informational messages for display on the display panel 12. The person waiting in the public area thereby is presented with advertisements targeted to the interests of the person. In the embodiment in which the person has designated other information interests, these are likewise sequenced for presentation. Further, the controller 14 also evaluates the information cached in the local memory of the display device 10 for sequencing and presentation of cached information or advertisements.

In an alternate embodiment, the card 20 includes codings that are representative of the designated profile interests and of the historical purchasing records of the owner of the card. These codings are communicated by the card 20 to the controller 14 during interrogation. This allows the controller 14 to locally evaluate the information messages and advertising messages in its cached memory. In this embodiment, the central computer 28 updates the designated interest areas during a purchasing transaction to reflect the changes made by the person from time to time in the personal profile. Similarly, codes reflecting the historical purchasing areas are updated during purchasing transactions.

Depending on the frequency of transit vehicles passing through the transit station, the duration of the availability of the advertisement for display is limited, for example, to a mean interval between departures of transit vehicles from the station. For other public areas using the advertising device 10, the duration of availability is a predetermined time, such as 10 minutes.

Accordingly, the present invention provides advertising devices for targeting advertisements to persons in the vicinity of the device. For each person carrying the electronic card 20 in the vicinity of the device 10, the controller 14 reads each of these electronic cards 20 and communicates the unique code 22 to the central computer 28. This process is carried on for each new unique code 22 received by interrogating the cards 20 in the vicinity of the device 12. Accordingly, the advertising device 10 provides advertising targeted to particular individuals in the vicinity of the device with a range of time that the person is present in the area of the display device 10.

What is claimed is:

1. A targeted informational system to provide advertising and other information messages targeted to the interests of persons in the vicinity of a display device for displaying the advertising and other information messages, comprising:

a display device adapted to provide a display of advertising or other information messages to persons in the vicinity of said display device;

a controller operatively coupled to said display device and adapted to communicate with at least one of a plurality of electronic cards, said electronic cards in the possession of persons in the vicinity of said display device and to sequence advertising and other information messages for display on said display device;

each of said electronic cards adapted to receive and to store information regarding the person associated with said electronic card;

a communicator coupled to said display device and adapted to communicate with said controller and to receive signals from the electronic cards in the vicinity of the display device; and a central computer adapted to communicate with said communicator, for receiving signals representative of the information about persons having said electronic cards in the vicinity of the display device and for communicating to the communicator advertising and other information messages relevant to particular persons in the vicinity of the display device;

whereby the display device displays advertising and other information messages targeted to the interests of particular persons in the vicinity of the display device.

2. The targeted informational system of claim 1, further comprising a reader device which communicates information regarding the purchase of goods and services by the owner of said electronic card to said central computer, whereby the central computer maintains information relating to the interests of the owner.

3. The targeted informational system of claim 1, wherein said display panel comprises an LED display of multiple lines with a plurality of addressable characters.

4. The targeted informational system of claim 1, wherein said electronic card comprises a signal responsive circuit for communicating with the communicator.

5. The targeted informational system of claim 1, further comprising a wireless transceiver for wireless communication by said central computer with said communicator.

6. The targeted informational system of claim 1, further comprising a wired connection network for wired communication by said central computer with said communicator.

7. A method of providing advertising and other information messages targeted to the interests of persons in the vicinity of the advertising device comprising the steps of:

(a) providing a display device for display of advertising or other information messages to persons in a vicinity of said display device;

(b) communicating information about a person in the vicinity of the display device from an electronic card in the possession of the person, said electronic card adapted to receive and to store information regarding the person associated with said electronic card;

(c) communicating said information about the person to a central computer having advertisements and other information messages;

(d) communicating selected ones of the advertising and other information messages to the display device based on the information about the person; and (e) displaying the advertising and other information messages relevant to the person;

whereby the display device displays advertising and other information messages targeted to the interests of particular persons in the vicinity of the display device.

* * * * *

UNITED STATES PATENT AND TRADEMARK OFFICE
CERTIFICATE OF CORRECTION

PATENT NO. : 6,390,376 B2　　　　　　　　　　　　　　　　　　　　Page 1 of 1
DATED : May 21, 2002
INVENTOR(S) : Paul Bermel It is certified that error appears in the above-identified patent and that said Letters Patent is hereby corrected as shown below:

Title page,
Related U.S. Application Data, please change "February 22, 2001" to
-- February 23, 2000 --.

Column 1,
Line 5, please change "February 22, 2001" to -- February 23, 2000 --.

Signed and Sealed this

Nineteenth Day of November, 2002

*Attest:*

*Attesting Officer*

JAMES E. ROGAN
*Director of the United States Patent and Trademark Office*